US009386518B2

(12) United States Patent
Fischer

(10) Patent No.: US 9,386,518 B2
(45) Date of Patent: *Jul. 5, 2016

(54) CELL SITE POWER GENERATION

(71) Applicant: T-Mobile USA, Inc., Bellevue, WA (US)

(72) Inventor: Steve Fischer, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 118 days.

This patent is subject to a terminal disclaimer.

(21) Appl. No.: 14/251,539

(22) Filed: Apr. 11, 2014

(65) Prior Publication Data

US 2014/0220957 A1 Aug. 7, 2014

Related U.S. Application Data

(62) Division of application No. 12/170,675, filed on Jul. 10, 2008, now Pat. No. 8,729,732.

(51) Int. Cl.
*H04M 1/00* (2006.01)
*H04W 52/02* (2009.01)
*H02J 1/10* (2006.01)
(Continued)

(52) U.S. Cl.
CPC .............. *H04W 52/0206* (2013.01); *H02J 1/10* (2013.01); *H02J 9/061* (2013.01); *H02J 9/066* (2013.01); *H04W 24/04* (2013.01); *Y02B 60/50* (2013.01); *Y10T 307/62* (2015.04); *Y10T 307/625* (2015.04)

(58) Field of Classification Search
CPC .............. H02J 9/06; H02J 9/061; H02J 9/066
USPC .......................... 307/64–66; 363/69; 320/123
See application file for complete search history.

(56) References Cited

U.S. PATENT DOCUMENTS 3,949,238 A * 4/1976 Brookes .................... H02J 9/06
307/23
4,451,773 A 5/1984 Papathomas et al.
(Continued)

FOREIGN PATENT DOCUMENTS

EP 1289091 3/2003
EP 1296464 10/2007
(Continued)

OTHER PUBLICATIONS

European Patent Office, Supplementary Partial European Search Report, EP Patent Application 10803021.4, mailed Dec. 4, 2014, 5 pages.

(Continued)

*Primary Examiner* — Fritz M Fleming
(74) *Attorney, Agent, or Firm* — Perkins Coie LLP

(57) ABSTRACT

A system, apparatus, method, and manufacture for generating backup power in a wireless communications system such as a wireless communications service base station. The system includes a communications interface, a primary power interface, a generator, rectifiers, and a battery circuit. During normal operation, the communications interface is powered from the primary power interface. During a power outage, the communications interface is powered from either the generator or the battery circuit. The generator is cycled on and off during power outages to charge the battery circuit while conserving fuel. To decrease rectification loss, rectifiers are run near full load while rectifying the generator output.

15 Claims, 7 Drawing Sheets

(51) Int. Cl.
*H02J 9/06* (2006.01)
*H04W 24/04* (2009.01)

(56) References Cited

U.S. PATENT DOCUMENTS

| | | | |
|---|---|---|---|
| 4,931,947 A | 6/1990 | Werth et al. | |
| 5,099,694 A | 3/1992 | Sumio et al. | |
| 5,185,684 A | 2/1993 | Beihoff et al. | |
| 5,332,927 A | 7/1994 | Paul et al. | |
| 5,532,525 A | 7/1996 | Kaiser et al. | |
| 5,602,459 A | 2/1997 | Rogers | |
| 5,646,462 A * | 7/1997 | Cortes | H02J 1/10 307/127 |
| 5,661,463 A | 8/1997 | Letchak et al. | |
| 5,705,929 A | 1/1998 | Caravello et al. | |
| 5,844,327 A | 12/1998 | Batson | |
| 5,886,503 A | 3/1999 | McAndrews et al. | |
| 5,894,407 A | 4/1999 | Aakalu et al. | |
| 5,920,129 A * | 7/1999 | Smith | H02J 9/061 307/64 |
| 5,934,079 A | 8/1999 | Han et al. | |
| 5,939,990 A | 8/1999 | Ahn | |
| 6,137,261 A | 10/2000 | Kurle et al. | |
| 6,169,390 B1 | 1/2001 | Jungreis | |
| 6,184,593 B1 | 2/2001 | Jungreis | |
| 6,188,591 B1 | 2/2001 | Ruter et al. | |
| 6,223,037 B1 | 4/2001 | Parkkila | |
| 6,281,602 B1 | 8/2001 | Got et al. | |
| 6,304,059 B1 | 10/2001 | Chalasani et al. | |
| 6,343,498 B1 | 2/2002 | Oba et al. | |
| 6,463,295 B1 | 10/2002 | Yun | |
| 6,469,471 B1 | 10/2002 | Anbuky et al. | |
| 6,533,031 B1 | 3/2003 | Garcia et al. | |
| 6,577,478 B2 | 6/2003 | Kim et al. | |
| 6,583,603 B1 | 6/2003 | Baldwin | |
| 6,614,671 B2 | 9/2003 | Thrap | |
| 6,630,750 B2 | 10/2003 | McAndrews | |
| 6,639,769 B2 | 10/2003 | Neiger et al. | |
| 6,700,802 B2 | 3/2004 | Ulinski et al. | |
| 6,751,205 B2 | 6/2004 | Menon et al. | |
| 6,782,264 B2 | 8/2004 | Anderson | |
| 6,889,752 B2 | 5/2005 | Stoller | |
| 6,929,785 B2 | 8/2005 | Grieve et al. | |
| 7,164,667 B2 | 1/2007 | Rayment et al. | |
| 7,180,210 B1 | 2/2007 | Jorgenson et al. | |
| 7,245,212 B2 | 7/2007 | Cope et al. | |
| 7,366,120 B2 | 4/2008 | Handforth et al. | |
| 7,466,225 B2 | 12/2008 | White, II et al. | |
| 7,904,115 B2 | 3/2011 | Hageman et al. | |
| 7,970,585 B2 | 6/2011 | Van Sloun et al. | |
| 8,005,510 B2 | 8/2011 | Fischer | |
| 8,279,074 B2 | 10/2012 | Fischer | |
| 8,310,103 B2 | 11/2012 | Fischer | |
| 8,412,272 B2 | 4/2013 | Fischer | |
| 2001/0033502 A1 | 10/2001 | Blair et al. | |
| 2004/0178770 A1 | 9/2004 | Gagnon et al. | |
| 2004/0218567 A1 | 11/2004 | Budka et al. | |
| 2005/0213527 A1 | 9/2005 | Xie | |
| 2006/0182262 A1 | 8/2006 | Goldman et al. | |
| 2006/0267411 A1 | 11/2006 | Farmer | |
| 2006/0284489 A1 | 12/2006 | Gross et al. | |
| 2007/0086132 A1 | 4/2007 | Ravera et al. | |
| 2007/0119638 A1 | 5/2007 | Grieve | |
| 2007/0200435 A1 | 8/2007 | Willets et al. | |
| 2008/0013528 A1 | 1/2008 | Miller et al. | |
| 2008/0042493 A1 | 2/2008 | Jacobs | |
| 2008/0064361 A1 | 3/2008 | Bjork et al. | |
| 2008/0303527 A1 | 12/2008 | Fechalos et al. | |
| 2009/0267417 A1 | 10/2009 | Lee | |
| 2010/0007506 A1 | 1/2010 | Fischer | |
| 2010/0009694 A1 | 1/2010 | Fischer | |
| 2010/0009724 A1 | 1/2010 | Fischer | |
| 2011/0021186 A1 | 1/2011 | Fischer | |
| 2013/0069433 A1 | 3/2013 | Fischer | |
| 2013/0231156 A1 | 9/2013 | Fischer | |

FOREIGN PATENT DOCUMENTS

| | | |
|---|---|---|
| GB | 2281458 | 3/1995 |
| KR | 200380026 | 3/2005 |
| WO | WO-97/34432 | 9/1997 |
| WO | WO-0207464 | 1/2002 |
| WO | 2005060287 A1 | 6/2005 |
| WO | WO-2008030171 | 3/2008 |
| WO | WO-2010006307 | 1/2010 |
| WO | WO-2010006308 | 1/2010 |
| WO | WO-2011011791 | 1/2011 |
| WO | WO-2011115640 | 9/2011 |

OTHER PUBLICATIONS

European Patent Office, Extended European Search Report, EP Application 09795263.4, mailed May 27, 2014, 4 pages.
International Search Report and Written Opinion for PCT/US2009/050313; Filed on Jul. 10, 2009, Applicant: T-Mobile USA, Inc.; Date of Mailing: Sep. 3, 2009, 14 pages.
International Search Report and Written Opinion for PCT/US2009/050315; Filed on Jul. 10, 2008; Applicant: T-Mobile USA, Inc.; Date of Mailing: Sep. 10, 2009, 12 pages.
"System Design," Hunter International, Aug. 22, 2008, 2 pages. http://209.85.173.104/search?q=cache:w3UiSdhZ7gYJ:www.functional-telecom.com/page.
"Proton exchange membrane fuel cell," Wikipedia, Feb. 25, 2009, 6 pages. http://en.wikipedia.org/wiki/Proton_exchange_membrane_fuel_cell.
"Fuel Processing," IdaTech Advanced Fuel Cell Solutions, http://www.idatech.com/Fuel-Cell-Technology-Fuel-Processing.asp, Feb. 25, 2009, 1 page.
"Fuel Cells," IdaTech Advanced Fuel Cell Solutions, http://www.idatech.com/Fuel-Cell-Technology-Fuel-Cells.asp, Feb. 25, 2009, 1 page.
"Methanol," IdaTech Advanced Fuel Cell Solutions, http://www.idatech.com/Fuel-Cell-Technology-Methanol.asp, Feb. 25, 2009, 2 pages.
"iGen™ Fuel Cell Power Supply," IdaTech LLC., 2 pages; May 13, 2011.
"ElectraGen™ XTi Integrated Fuel Cell System," IdaTech LLC., 2 pages; May 13, 2011.
"Glossary," IdaTech Advance Fuel Cell Solutions, http://www.idatech.com/Fuel-Cell-Technology-Glossary.asp, Feb. 25, 2009, 2 pages.
"Battery Charging," IdaTech Advance Fuel Cell Solutions, http://www.idatech.com/Products-Services-Utilities.asp, Feb. 25, 2009, 1 page.
"Generator Start Control Module—MINI (2 Wire to 3 Wire)," Atkinson Electronics, Inc., rev. Sep. 2005, 8 pages; Feb. 17, 2010.
International Search Report and Written Opinion for PCT/US2010/043267; Filed on Jul. 26, 2010; Applicant: T-Mobile USA, Inc.; Date of Mailing Apr. 5, 2011; 9 pages.
International Search Report and Written Opinion for PCT/US2010/043263; Filed on Jul. 26, 2010; Applicant: T-Mobile USA, Inc.; Date of Mailing Apr. 15, 2011; 8 pages.
European Patent Office, Supplementary European Search Report, EP Patent Application 09795264.2, mailed Aug. 21, 2012, 10 pages.
European Patent Office, Extended European Search Report, EP Application 10848118.5, mailed Apr. 4, 2014, 9 pages.
"3rd Generation Partnership Project; Technical Specification Group GSM/EDGE Radio Access Network; Radio subsystem link control (Release 7)", 3GPP TS 45.008, No. V7.11.0, Feb. 1, 2008, pp. 1-117.

* cited by examiner

CELL SITE POWER GENERATION

CROSS-REFERENCES TO RELATED APPLICATIONS

This application is a divisional application of U.S. patent application Ser. No. 12/170,675, filed on Jul. 10, 2008, and entitled "CELL SITE POWER GENERATION," which is hereby incorporated herein in its entirety by reference. This application is also related to U.S. patent application Ser. No. 12/365,165 filed Feb. 3, 2014, now U.S. Pat. No. 8,279,074, and entitled "BATTERY MONITORING SYSTEM, SUCH AS FOR USE IN MONITORING CELL SITE POWER SYSTEMS", which is incorporated by reference herein in its entirety.

BACKGROUND

The popularity of commercial wireless communications services (e.g., wireless telephony, wireless network access, and wireless email) has substantially increased during recent years. In many cases, users, such as consumers, mobile workers, emergency response personnel, and/or the like, now utilize these services for both personal and business communications. Likewise, users are also increasingly relying on these services. For example, some households forgo wired telephone service in favor of wireless telephone service, some government agencies rely on these services for both routine and emergency communications, and businesses rely on these services to communicate with customers and mobile workers. Correspondingly, the cost (both financial and nonfinancial) of outages is also increasing.

Typical commercial wireless communications service (CMRS) providers rely on remote facilities to facilitate the provision of services. For instance, CMRS providers rely on base stations (e.g., cell sites, radio repeaters, wireless to back-haul interfaces, etc.) to facilitate some communications services. If a base station experiences a loss of commercially-provided electrical power, users near the base station may experience a service outage. Power outages are an example of a common cause for base station failures. For example, natural disasters, rolling brownouts, accidents, and/or the like may result in power outages. While most base stations include some form of backup power (e.g., generators and/or batteries), these forms of backup power may not provide sufficient power during lengthy power outages and may require servicing, monitoring, and on-site maintenance. During lengthy power outages, use of commercial wireless communications services may increase due to users' needs and/or desires. Further, pending regulations may require commercial wireless communications service providers to provide base stations with at least seven days of backup power.

DETAILED DESCRIPTION

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Figure 1:
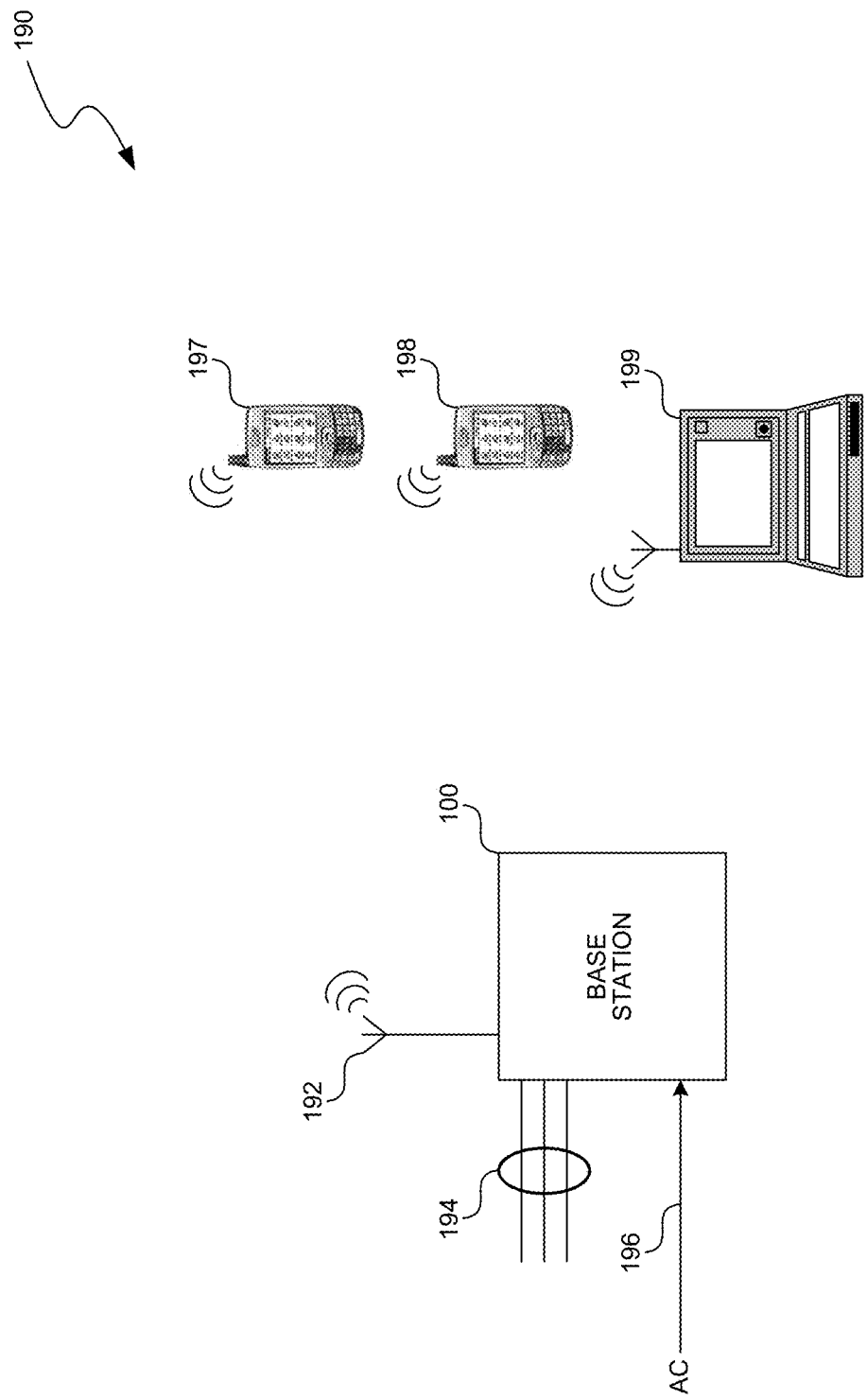
FIG. 1 is a block diagram of an embodiment of an environment for practicing the invention.

FIG. 1 is a block diagram of environment 190 in which the invention may be practiced. As shown, environment 190 includes base station 100 and wireless devices 197-199. Base station 190 includes antenna 192 and is coupled to back-haul 194 and to primary power source AC over line 196. Base station 190 and wireless devices 197-199 are configured to wirelessly communicate with each other.

Base station 100 may include virtually any device for facilitating wireless network access. For example, base station 100 may be a wireless telephony base station, a wireless network access base station, a wireless email base station, and/or the like. In one embodiment, base station 100 is operated by a mobile telephony service provider. Generally, base station 100 is configured to provide a network interface for wireless devices 197-199 by providing an interface (via antenna 192) between wireless devices 197-199 and back-haul 194. Base station 100 and wireless devices 197-199 may communicate using any wireless protocol or standard. These include, for example, Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), and/or the like.

Back-haul 194 may be any connection that provides a network interface for base station 100. For example, back-haul 194 may include one or more T-1 connections, T-3 connections, OC-3 connections, frame relay connections, Asynchronous Transfer Mode (ATM) connections, microwave connections, Ethernet connections, and/or the like. In addition, back-haul 194 may provide an interface to a telephone switch (e.g., to a 5ESS switch or a Private Branch Exchange switch) to a data network (e.g., to a router or network switch), and/or the like.

Base station 100 is also powered from primary power source AC over line 196. Primary power source AC may be provided by virtually any power source. For example, it may be provided by a public utility, from solar power, from a turbine, from a fuel cell, and/or the like. At times, however, primary power source AC may provide insufficient power for base station 100. As discussed below, base station 100 also includes backup power sources.

Wireless devices 197-199 may include virtually any devices for communicating over a wireless network. For example, wireless devices 197-199 may include mobile telephones (e.g., cellular telephones, GSM telephones, TDMA telephones, LTE telephones, etc.), wireless data devices (e.g., Personal Digital Assistants (PDAs), computers, pagers, etc.), and/or the like.

One skilled in the art will appreciate that although illustrated in the context of a wireless telecommunications environment, the invention may be practiced in any environment in which backup power serves a commercial, public, or private operation or system reliant upon electrical power.

Figure 2A:
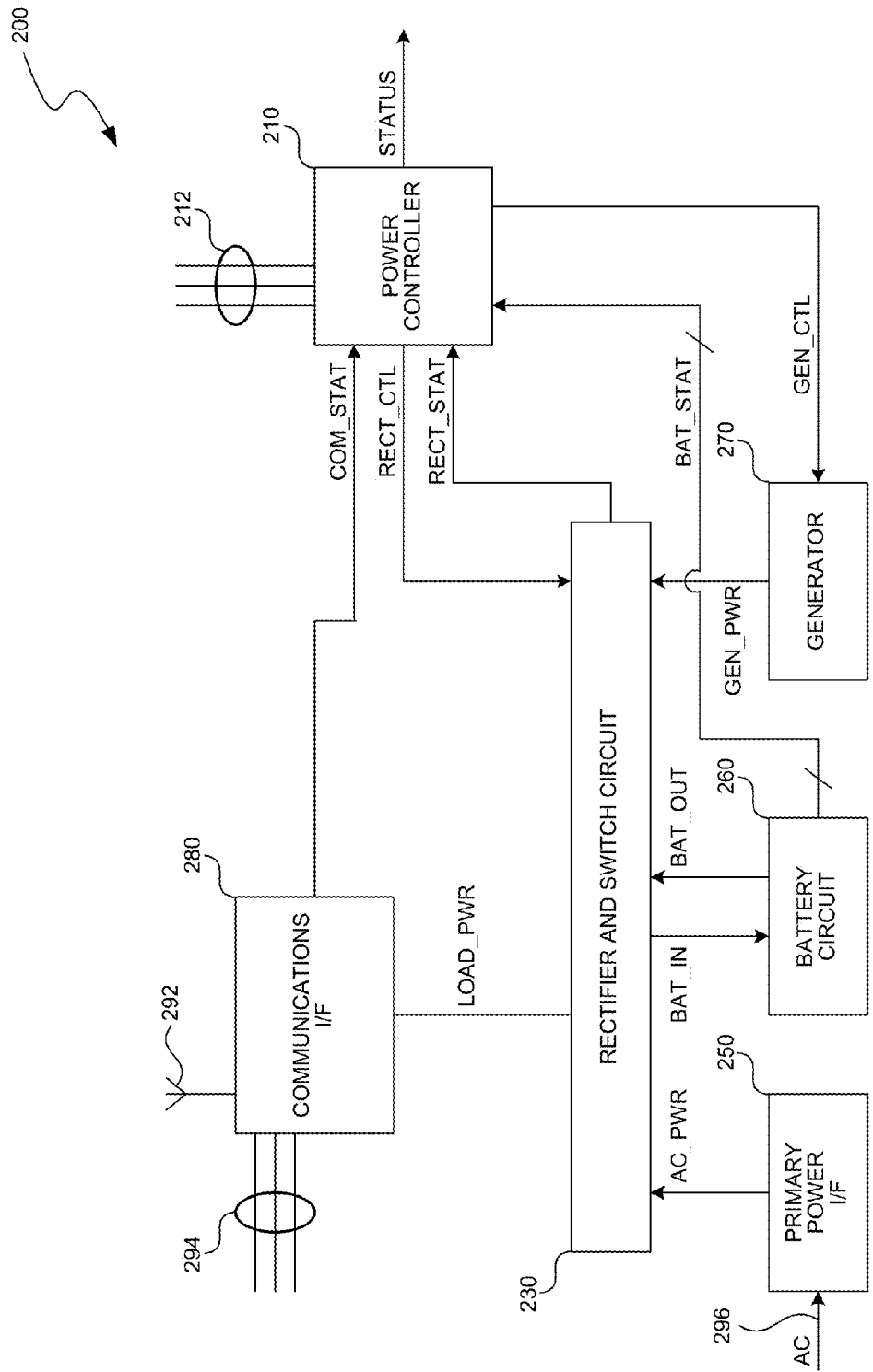
FIG. 2A is a block diagram of a base station in accordance with an embodiment of the invention.

FIG. 2A is a block diagram of base station 200. Base station 200 includes power controller 210, rectifier and switch circuit 230, primary power interface 250, battery circuit 260, generator 270, and communications interface 280. Base station 200 may be employed as an embodiment of base station 100 of FIG. 1.

Power controller 210 is configured to control the power systems of base station 200. As illustrated, power controller 210 is configured to receive or provide control signals 212 and status signals COM_STAT, RECT_STAT, and BAT_STAT, and to provide output/control signals RECT_CTL, GEN_CTL, and STATUS, as discussed below.

In one embodiment, power controller 210 is configured to selectively enable and disable generator 270 and to control the operation of rectifier and switch circuit 230 based, at least in part, on the various status and control signal inputs. The operation of power controller 210 is discussed in further detail with regards to FIG. 3.

Figure 2B:
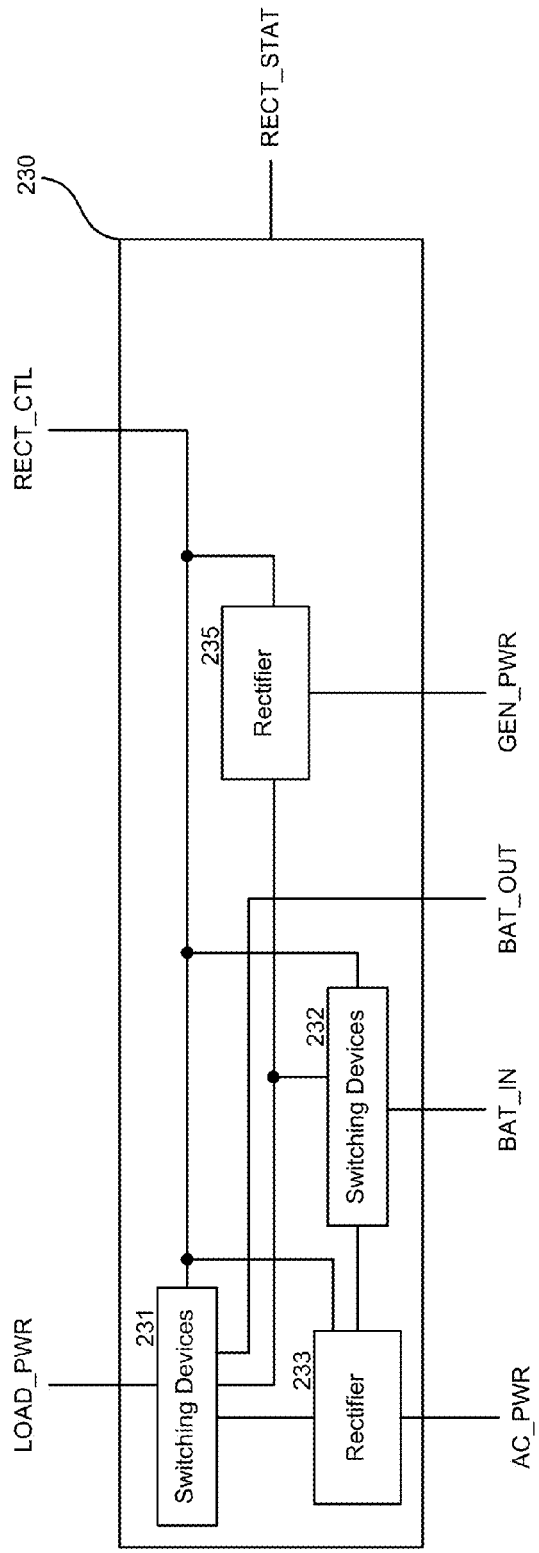
FIG. 2B is a block diagram of components of a rectifier and switch circuit in accordance with embodiments of the invention.

Rectifier and switch circuit 230 may include switching devices of any type (e.g., power field-effect-transistors, power insulated gate bi-polar transistors, relays, etc.) that are configured to selectively switch (e.g., route) power from either primary power interface 250, battery circuit 260, or generator 270 to communications interface 280. FIG. 2B is a block diagram of an example rectifier and switch circuit 230. In FIG. 2B, switching devices 231 route power to the communications interface 280 from the primary power interface 250, battery circuit 260, and generator 270. Rectifier and switch circuit 230 may also be configured to selectively switch power from either primary power interface 250 or generator 270 to battery circuit 260 for providing a charging current. For example, referring again to FIG. 2B, switching devices 232 routes power from either the primary power interface or the generator to the battery circuit. The switching between communications interface 280, primary power interface 250, battery circuit 260, and generator 270 may be controlled via control signal RECT_CTL from power controller 210.

In addition, rectifier and switch circuit 230 may also include multiple rectifiers that are each configured to rectify power either from primary power interface 250 or from generator 270 before providing it either to communications interface 280 or to battery circuit 260. For example, referring again to FIG. 2B, a rectifier 233 rectifies power from the primary power interface and a rectifier 235 rectifies power from the generator. Each of the rectifiers in rectifier and switch circuit 230 may be controlled via control signal RECT_CTL from power controller 210.

For some common rectifiers, rectification efficiency increases when the rectifier is run at higher loads. However, continuous operation of rectifiers at higher loads may increase operating temperatures and may lead to premature failure of the rectifiers. Accordingly, when base station 200 is powered from primary power source AC, communications interface 280's power draw may be balanced across each of the rectifiers of rectifier and switch circuit 230 to reduce the load on each rectifier. However, during a periods of primary power source reduced availability, the power drawn by communications interface 280 may be balanced across fewer rectifiers such that efficiency of each operating rectifier is increased.

Rectifier and switch circuit 230 may also be configured to provide status signal RECT_STAT to power controller 210 to, for example, indicate the status of rectifiers, the status of switches, the status of primary power source AC, the status of generator 270's output, failure conditions (e.g., failure of particular rectifiers, failure of particular switches, excessive current draw from communications interface 280, out of range input voltages, etc.), and/or the like. Status signal RECT_STAT may be provided to power controller 210 to enable power controller 210 to adjust the operation of rectifier and switch circuit 230 or generator 270 based on these and other conditions.

Primary power interface 250 is configured to couple primary power source AC to rectifier and switch circuit 230. Primary power interface 250 may include a circuit breaker, line filter, surge protector, power meter, and/or the like. However, in one embodiment, primary power interface 250 may simply be a wire segment connecting primary power source AC to rectifier and switch circuit 230.

Battery circuit 260 is configured to store power that is provided by primary power source AC or by generator 270. Battery circuit 260 may include any number of batteries arranged in any combination of series configurations, parallel configurations, and/or series and parallel configurations. In one embodiment, battery circuit 260 includes multiple strings of serially connected absorbed glass mat lead-acid batteries. However, any suitable type of battery may be employed. Further, battery circuit 260 is configured to provide status signal BAT_STAT to power controller 210. For example, status signal BAT_STAT may be employed to indicate the output voltage of battery circuit 260, a voltage of each individual battery, and/or the like. Also, status signal BAT_STAT may include multiple signals and be provided on one or more signal lines.

Power controller 210 may be configured to determine a failure condition or approximate a charge percentage for battery circuit 260, and/or the like, from status signal BAT_STAT. While battery circuit 260 is illustrated as being coupled to rectifier and switch circuit 230 by signals BAT_IN and BAT_OUT, in other embodiments, signals BAT_IN and BAT_OUT may be a single signal.

Generator 270 is configured to generate power under the control of power controller 210 for powering communications interface 280 and for charging battery circuit 260. Generator 270 is further configured to enable and disable power generation based on control signal GEN_CTL. The output of generator 270 is provided to rectifier and switch circuit 230 via signal GEN_PWR.

With certain generators, fuel consumption is primarily a function of run-time. For these generators, the increase in fuel consumption is relatively insignificant when the load current is increased. Accordingly, the total power produced from a given amount of fuel is greater when operating a generator at high loads for short durations as compared to continuously operating a generator at lower loads. In addition, operating a higher output wattage generator may produce a greater the total power output from a given amount of fuel than a lower output wattage generator.

Thus, to conserve fuel, generator 270 may be enabled when the charge on battery circuit 260 is relatively low and disabled when the charge is relatively high. While running, generator 270 may be employed to power communications interface 280 and to charge battery circuit 260. While generator 270 is stopped, communications interface 280 may be powered from battery circuit 260. In this way, generator 270 produces more power for a given amount of fuel. In one embodiment, generator 270 is enabled when the voltage of battery circuit 260 represents that less than a 20 percent charge remains on battery circuit 260 and is disabled when the voltage represents that battery circuit 260 has an 82 percent charge. Although, any other suitable percentages, voltages, charge conditions, and/or the like may be employed. Thus, power controller 210 controls generator 270 to operate intermittently, with high load, when the charge on battery circuit 260 is below a threshold; otherwise, battery circuit 260 provides backup power to communications interface 280. Also, generator 270 may be selected such that while powering communications interface 280 and charging battery circuit 260 near a maximum charge rate (e.g., a manufacturer specified maximum rate, a manufacturer specified recommended rate, an operator specified rate, etc.) generator 270 operates at high load. This selection may be based on the DC load requirements of communications interface 280, the power available to charge battery circuit 260, the number of batteries in battery circuit 260, the ampere hour ratings of the batteries in battery circuit 260, expected efficiency, anticipated future power requirements, operating margins, and/or the like. In one embodiment, the maximum charge rate for battery circuit 260 is approximately twice the recommended discharge rate for battery circuit 260.

As one example, a 20 kilowatt water cooled Generac generator and a 370 ampere hour battery circuit may be employed to power a Nokia UltraSite communications interface having 15 to 18 radio units and an additional two rectifiers in the rectifier and switch circuit. In this example, while powering the communications interface, approximately 80 amperes are available to charge and cool the battery circuit. Also, a charged battery circuit has approximately 220 ampere hours (after accounting for internal resistance and other losses) available to power communications interface 280 between charging cycles. Under normal circumstances, 220 ampere hours provides 5.5 to 7 hours of power to communications interface 280. After the generator is enabled, it spends approximately 6 hours charging the battery circuit, first at a high load, and later at a lower load while cooling off.

Such operation may increase the service life and decrease maintenance for both battery circuit 260 and generator 270. Likewise, such operation may increase the length of time that communications interface 280 may operate from backup power. In one embodiment, a 250 gallon propane tank may be sufficient to power communications interface 280 for 6 days with intermittent generator operation as compared to 3.5 days with continuous generator operation.

Generator 270 may include a gasoline generator, a diesel generator, a propane generator, a natural gas generator, a methanol generator, an ethanol generator, and/or the like. Moreover, generator 270 may be either air-cooled or liquid-cooled.

Communications interface 280 is configured to interface (via antenna 292) wireless devices to back-haul 294. Communications interface 280 typically includes both digital and radio frequency (RF) electronics. In one embodiment, communications interface 280 includes a RF transceiver and digital control circuitry. However, other components may also be associated with a transceiver and/or other circuits. Communications interface 280 is powered from rectifier and switch circuit 230 via line LOAD_PWR and is configured to provide status signal COM_STAT to indicate an operational status such as failure of back-haul 294, the number of wireless devices associated with base station 200, power consumption data, and/or the like.

Figure 3:
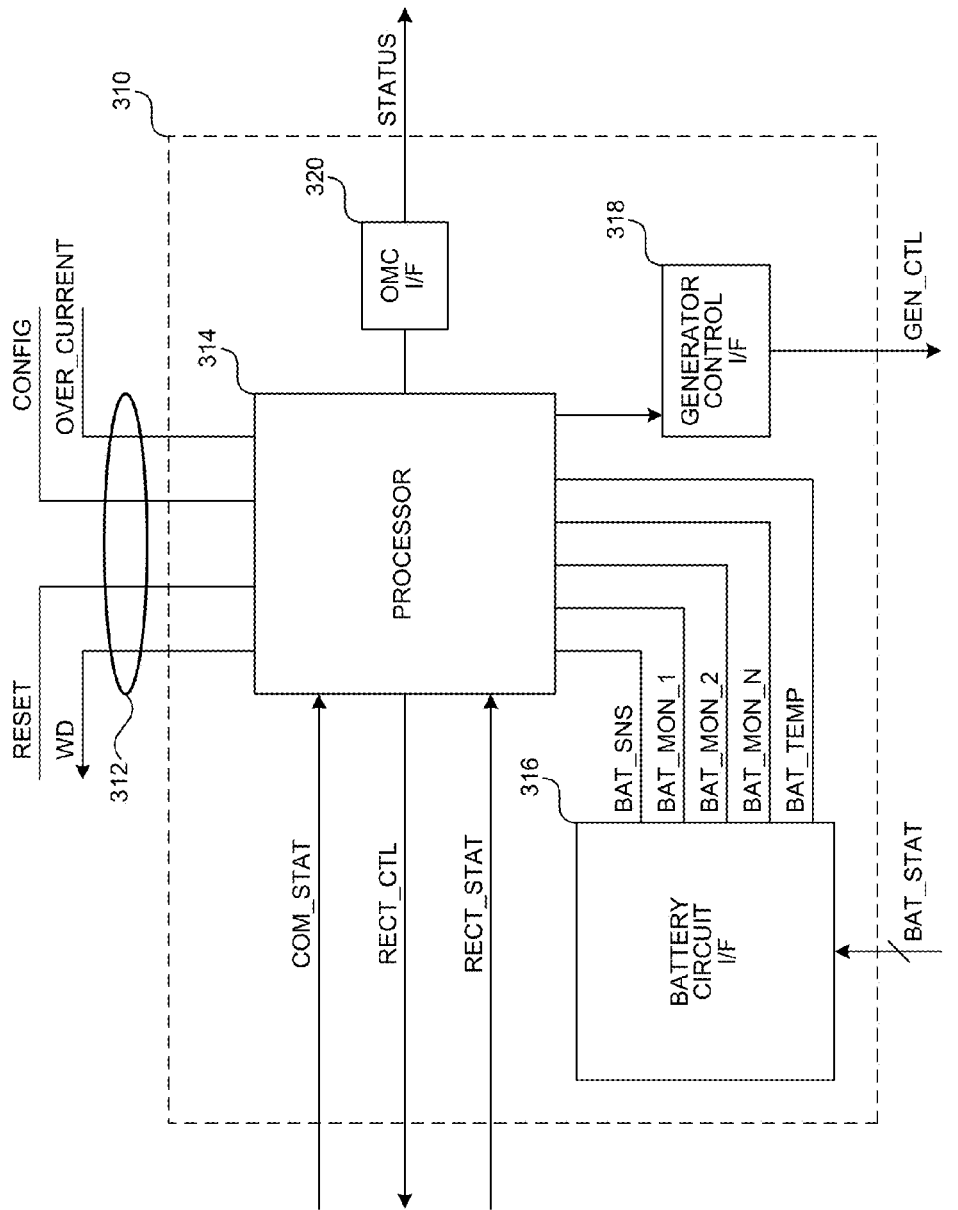
FIG. 3 is a block diagram of a power controller usable in the base station of FIG. 2A in accordance with an embodiment of the invention.

FIG. 3 is a block diagram of power controller 310. Power controller 310 includes processor 314, battery circuit interface 316, generator control interface 318, and operation, management, and control (OMC) interface 320. Power controller 310 may be employed as an embodiment of power controller 210 of FIG. 2A.

As illustrated, processor 314 is configured to control the operations of the rectifier and switch circuit (e.g., via control signal RECT_CTL) and the generator (e.g., via control signal GEN_CTL) and to provide a status signal to a remote system (e.g., STATUS). In one embodiment, processor 314 is configured to selectively enable and disable the generator based, at least in part, on the primary power source status and a battery circuit status. For example, the generator may be enabled when there is reduced availability of the primary power source and the battery circuit voltage falls below a threshold value. Likewise, the generator may be disabled when the primary power source provides sufficient power, when the battery circuit voltage is above another threshold value, when there is a failure of the battery circuit, when an over-current condition is detected, when a battery circuit temperature is above a threshold value, when there is a failure in the rectifier and switch circuit, when processor 314 is in reset, and/or the like.

In one embodiment, processor 314 detects a failure of the battery circuit based on a rate of change of the battery circuit output voltage or of the voltages of the individual batteries of the battery circuit.

To determine these and other conditions, processor 314 receives various status signals as illustrated in FIG. 3. For example, signals COM_STAT and RECT_STAT may be employed to respectively represent the status of the communications interface and of the rectifier and switch circuit. Likewise, signal BAT_SNS may be employed to represent the output voltage of the battery circuit, signals BAT_MON_1 to BAT_MON_N may be employed to represent the voltage across the individual batteries of the battery circuit, and signal BAT_TEMP may be employed to represent a temperature of the battery circuit. Also, signal RESET may be employed to reset and/or hold processor 314 in reset. Finally, control signal OVER_CURRENT may be employed to represent an over-current condition of the battery circuit, of the rectifier and switch circuit, of the generator, and/or the like. Likewise, processor 314 may be configured to control the rectifier and switch circuit based, at least in part, on the availability status of the primary power source, as discussed above.

As illustrated, processor 314 is also configured to provide watchdog signal WD to a watchdog circuit (not shown). The watchdog circuit may be arranged to reset the processor via the RESET signal if, for example, the watchdog signal WD remains unchanged for a predefined duration. In other embodiments, internal watchdog circuits, and/or the like, may also be employed.

Processor 314 is further configured to receive configuration signal CONFIG to represent a hardware configuration, to set various threshold levels, and/or the like. Any number of configuration signals may be provided. In one embodiment, configurations signals are employed to represent the number and/or types of rectifiers in the rectifier and switch circuit, the design voltage of the battery circuit, the type of generator, the number of battery strings in the battery circuit, and/or the like. For example, a configuration signal may be provided to indicate whether the generator is air-cooled so that an air-cooled generator may be run for a cooling off period prior to being disabled by processor 314. As another example, a configuration signal may be provided to indicate the load capacity of the rectifiers so that processor 314 may more accurately determine the number of active rectifiers for providing efficient rectification. As yet another example, a configuration signal may be provided to indicate the design voltage of the battery circuit so that processor 314 may more accurately estimate the charge on the battery circuit from the battery circuit output voltage.

Configuration signal CONFIG may be provided from a switch (e.g., a DIP switch), from pull-up resistors, from pull-down resistors, from jumpers, and/or the like. Alternatively, similar configuration information may be read by processor 314 from a memory or be received from another processor.

Processor 314 may be a microprocessor, a microcontroller, a digital signal processor (DSP), and/or the like. However, in other embodiments, digital logic, analog logic, combinations of digital logic and analog logic, and/or the like may also be employed instead of a processor. For example, such embodiments may be implemented in a field-programmable gate array (FPGA), in an application-specific integrated circuit (ASIC), in other programmable logic devices (PLDs), and/or the like.

Battery circuit interface 316 is configured to interface processor 314 to a battery circuit. For example, battery circuit interface 316 receives signal BAT_STAT from the battery circuit and provides discrete signals to processor 314. For example, signal BAT_STAT may be a multiplexed signal or may be provided on multiple signal lines. In one embodiment, battery circuit interface 316 includes an array of analog to digital converters (ADCs) that are configured to digitize each of signals BAT_SNS, BAT_MON_1 to BAT_MON_N, and BAT_TEMP for processor 314. However, multiplexers, drivers, buffers, logic gates, analog circuits, and/or the like may also be suitably employed.

Generator control interface 318 is configured to interface processor 314 to a generator such as generator 270 of FIG. 2A. In one embodiment, generator control interface 318 includes a relay, a level-shifter, a driver, a buffer, an inverter, logic gates, and/or the like that is configured to provide control signal GEN_CTL based, at least in part, on the output of processor 314. Also, generator control interface 318 and/or processor 314 may be configured such that a failure of either generator control interface 318 or processor 314 results in the generator being enabled. In this way, a failure of processor 314 and/or generator control interface 318 is less likely to cause a power interruption at the communications interface.

OMC interface 320 is configured to interface processor 314 to a remote system and to provide operational data regarding the base station and/or the base station power system to the remote system. OMC interface 320 may include drivers, buffers, inverters, logic gates, network interface units, multiplexers, and/or the like. Likewise, OMC interface 320 may be configured to multiplex the STATUS signal onto the back-haul or may provide the STATUS signal as a discrete signal.

Figure 4:
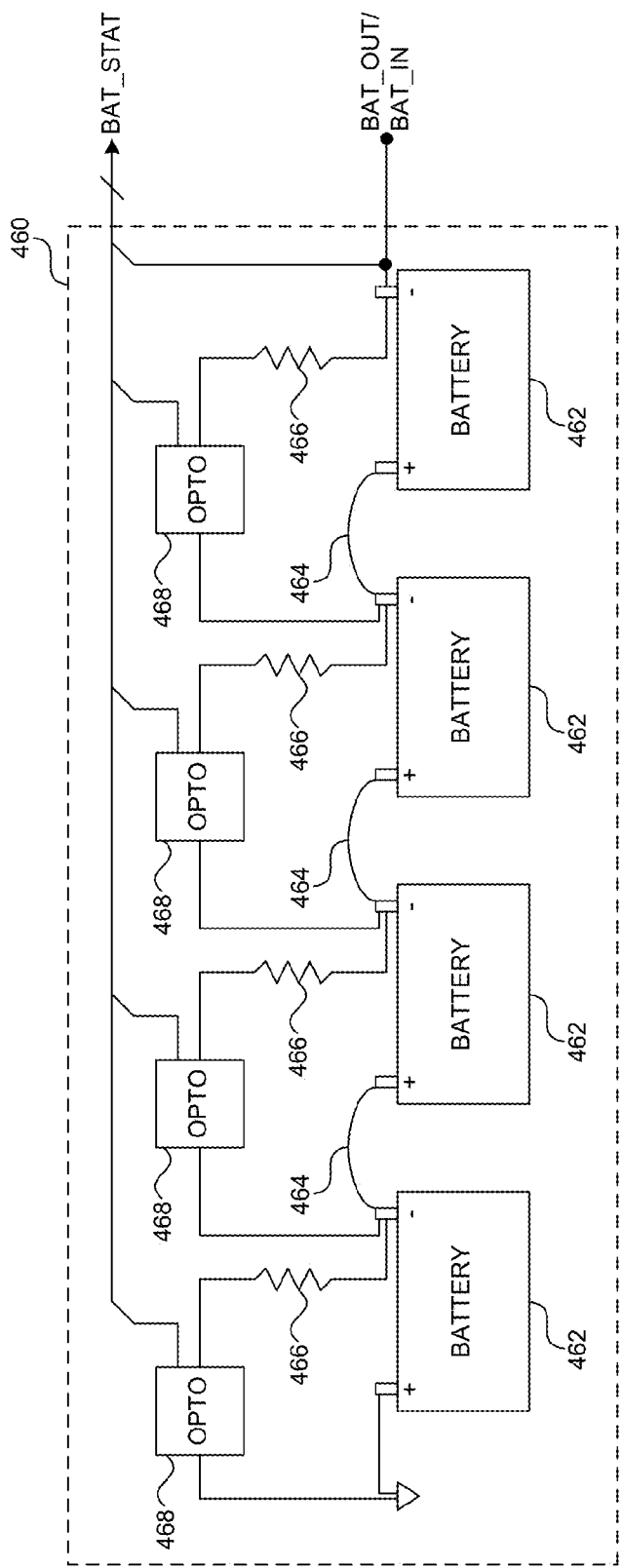
FIG. 4 is a schematic diagram of a battery circuit usable in the base station of FIG. 2A in accordance with an embodiment of the invention.

FIG. 4 is a schematic diagram of battery circuit 460. Battery circuit 460 includes batteries 462, jumpers 464, current limiting resistors 466, and opto-isolator circuits 468. Battery circuit 460 may be employed as an embodiment of battery circuit 260 of FIG. 2A.

As illustrated, battery circuit 460 is configured as a negative 48-volt battery circuit having one string of serially connected absorbed glass mat lead-acid batteries. In this embodiment, batteries 462 are serially connected by jumpers 464 to form a single battery string. However, other battery circuits may be configured with any number of batteries and any number of battery strings and may provide any positive or negative output voltage. In addition, battery circuit 460 includes opto-isolator circuits 468 to sense the voltage across each of the batteries and associated jumpers. Current limiting resistors 466 are also included to limit the current to opto-isolator circuits 468. By coupling opto-isolator circuits 468 across both the battery and the associated jumper, the effects of loose or corroded connections may be included in the opto-isolator circuit output and may be detected by the power controller.

In other embodiments, other isolated or non-isolated sense circuits may be employed instead of opto-isolator circuits 468. For example, ADCs, sense resistors, and/or the like may be employed.

Figure 5:
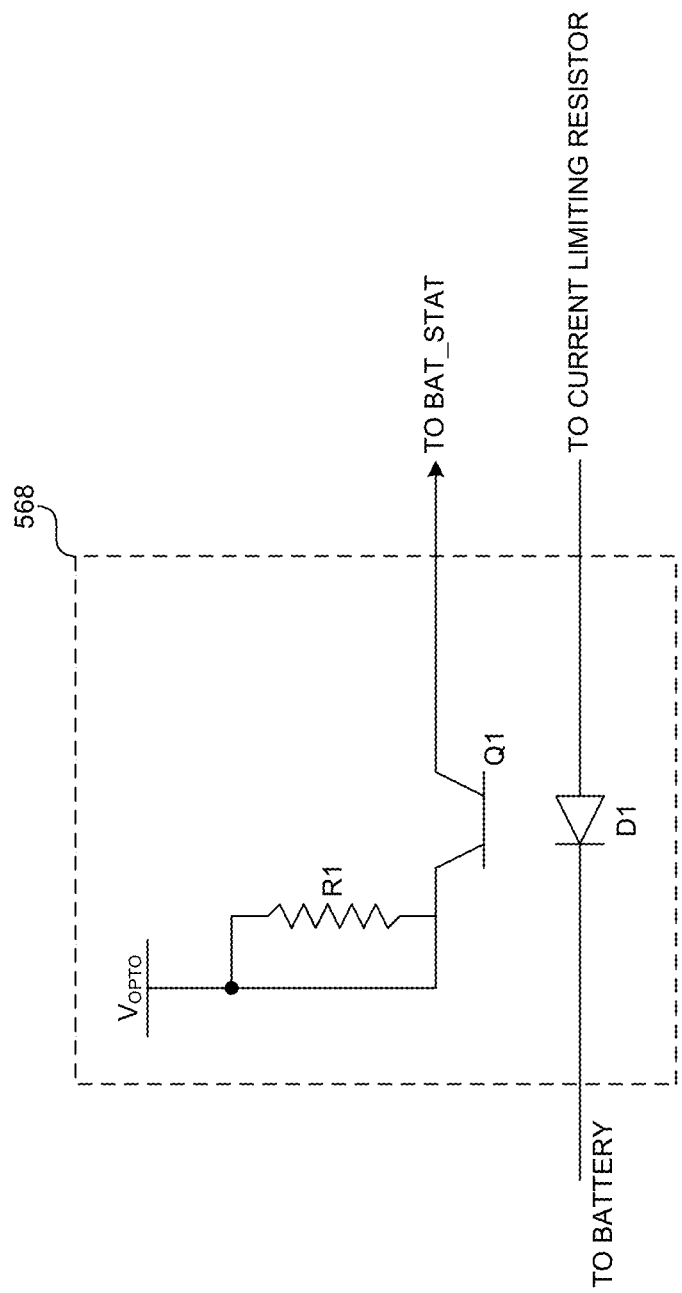
FIG. 5 is a schematic diagram of an opto-isolator usable in the battery circuit of FIG. 4 in accordance with an embodiment of the invention.

FIG. 5 is a schematic diagram of opto-isolator circuit 568. Opto-isolator circuit 568 includes diode D1, transistor Q1, and resistor R. Opto-isolator circuit 568 may be employed as embodiments of opto-isolator circuits 468 of FIG. 4.

Opto-isolator circuit 568 is configured to provide an output signal that is based on the voltage applied across diode D1. In operation, the voltage across diode D1 causes current flow through diode D1 and causes diode D1 to provide an emitted light with an intensity that is related to the magnitude of the current flow. The emitted light is received by transistor Q1 to provide an output signal. Resistor R1 biases transistor Q1 and may be of any suitable value.

Figure 6:
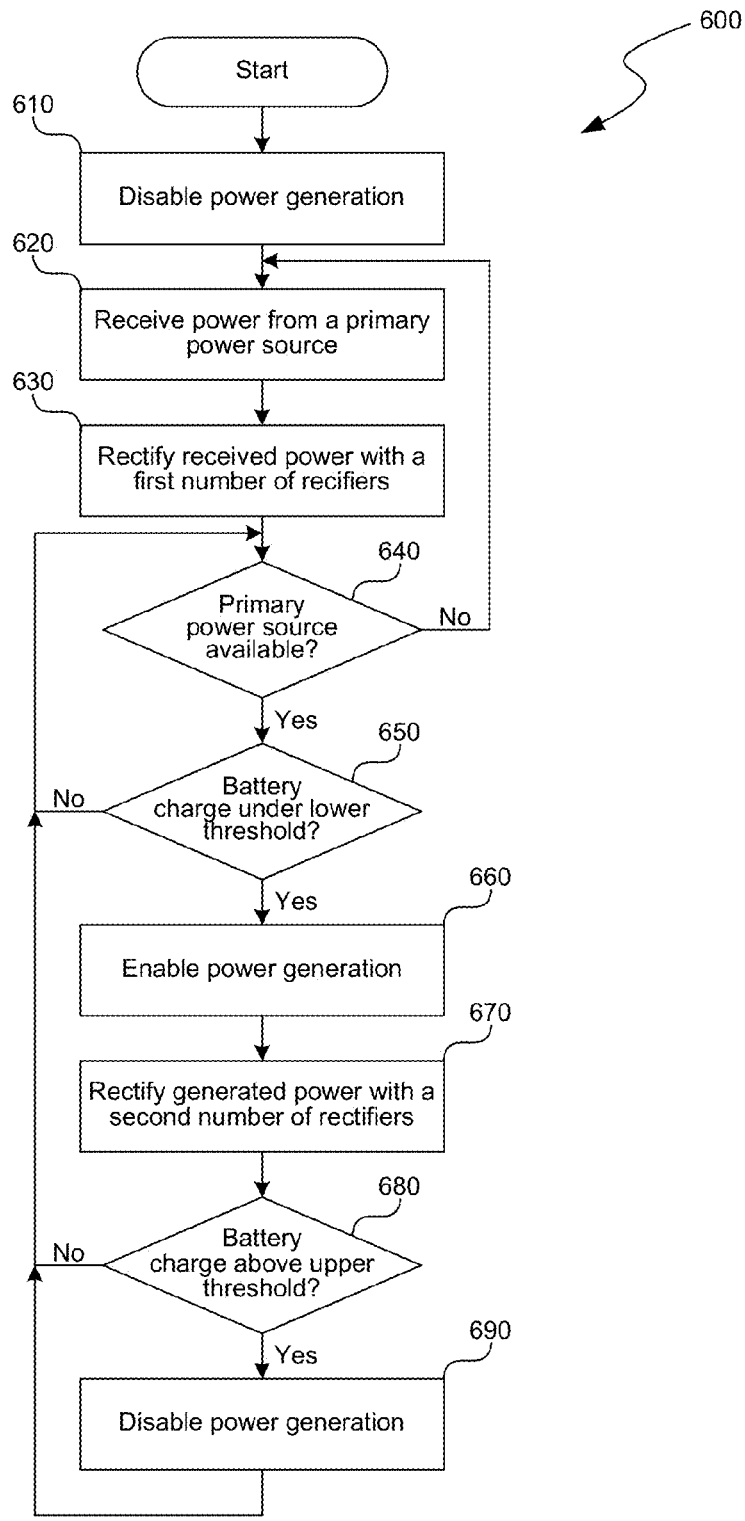
FIG. 6 is a logical flow diagram of a process for conserving power in a wireless communications system in accordance with an embodiment of the invention.

FIG. 6 is a logical flow diagram of process 600 for conserving power in a wireless communications system. For clarity, process 600 is described below as being performed by base station 200 of FIG. 2A. However, process 600 may also be performed by processor 314 of FIG. 3 and may be stored in non-volatile memory. Process 600 may also be performed by other processors, by other components, or in other systems, whether or not such processors, components, or systems are described herein.

Flowing from a start block, processing begins at step 610 where power controller 210 disables generator 270. For example, power controller 210 may disable generator 270 to conserve fuel while primary power source AC provides power to primary power interface 280. At step 620, primary power interface 280 receives power from primary power source AC. At step 630, rectifier and switch circuit 230 employs a first number of rectifiers to rectify the received power. For example, to decrease the operating temperature of the operating rectifiers, the first number of rectifiers may include all or almost all of the rectifiers in rectifier and switch circuit 230. In one embodiment, base station 200 may employ the rectified power to power communications interface 280 or to charge battery circuit 260.

At decision block 640, power controller 210 determines whether power from primary power source AC is available. Power controller 210 may perform this determination based on status signal RECT_STAT, based on a status signal from primary power interface 250, and/or the like. If power controller 210 does detect availability of power from primary power source 250, it returns processing to step 620. Otherwise, power controller 210 continues processing at decision block 650.

At decision block 650, power controller 210 determines if the battery charge is under a lower threshold. For example, power controller 210 may estimate battery circuit 260's remaining charge based on the battery circuit 260's output voltage. If this remaining charge is not under the lower threshold, power controller 210 returns processing to decision block 640. Otherwise, power controller 210 continues to step 660.

Power controller 210 enables power generation at step 660, for example, by starting generator 270. After power controller 210 enable power generation, processing flows to step 670 where rectifier and switch circuit 230 employs a second number of rectifiers to rectify the generated power. In one embodiment, the second number of rectifiers is less than the first number of rectifiers such that each of the operating rectifiers operates at a higher load and with higher efficiency. From step 670, processing flows to decision block 680.

At decision block 680, power controller 210 determines if the battery charge is above an upper threshold. For example, power controller 210 may estimate battery circuit 260's remaining charge based on the battery circuit 260's output voltage. If the remaining charge on battery circuit 260 is not above the upper threshold, power controller 210 returns processing to decision block 640. Otherwise, power controller 210 continues processing at step 690 where power controller 210 disables generator 270. From step 690, power controller 210 returns processing to decision block 640.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A method of providing generated power to a wireless communications cell site having a transceiver and associated telecommunications components, the method comprising:
   receiving power from a primary power source to power the wireless communications cell site;
   while receiving power from the primary power source, employing a first number of rectifiers to rectify the power received from the primary power source,
      wherein each of the first number of rectifiers is coupled in parallel between the primary power source and at least one output terminal to supply power to the telecommunications components of the wireless communications cell site;
   determining an availability status of the primary power source;
   selectively enabling and disabling a generator to generate power based, at least in part, on the availability status; and
   while employing the generator to generate power, employing a second number of rectifiers to rectify the generated power,
      wherein the second number is less than the first number, and
      wherein each of the second number of rectifiers is coupled in parallel between the generator and the output terminal to supply power to the telecommunications components of the wireless communications cell site.

2. The method of claim 1, further comprising:
   routing at least power from the primary power source, generated power, or stored power to a communications interface.

3. The method of claim 1, further comprising:
   employing a battery circuit to store generated power;
   sensing a voltage of the battery circuit;
   determining a rate of change of the voltage; and
   determining a failure condition of the battery circuit based, at least in part, on the rate of change of the voltage.

4. The method of claim 1, further comprising:
   employing a battery circuit to store generated power;
   sensing a voltage of the battery circuit;
   if the sensed voltage represents that the battery circuit has less than approximately a 20 percent charge, enabling the generator; and
   if the sensed voltage of the battery circuit represents that the battery circuit has more than approximately an 82 percent charge, disabling the generator.

5. The method of claim 1, further comprising:
   receiving an operational status of a back-haul that is coupled to a communications interface; and
   selectively employing the generator based, at least in part, on the received operational status of the back-haul.

6. A wireless communications cell site comprising:
   a transceiver;
   a processor; and
   a non-volatile memory having instructions that when executed by the processor cause the transceiver and associated telecommunications components of the wireless communications cell cite to:
      receive power from a primary power source to power the wireless communications cell site;
      while receiving power from the primary power source, employ a first number of rectifiers to rectify the power received from the primary power source,
         wherein each of the first number of rectifiers is coupled in parallel between the primary power source and at least one output terminal to supply power to the telecommunications components of the wireless communications cell site;

determine an availability status of the primary power source;

selectively enable and disable a generator to generate power based, at least in part, on the availability status; and while employing the generator to generate power, employ a second number of rectifiers to rectify the generated power,
wherein the second number is less than the first number, and
wherein each of the second number of rectifiers is coupled in parallel between the generator and the output terminal to supply power to the telecommunications components of the wireless communications cell site.

7. The wireless communications cell site of claim 6, wherein the instructions when executed by the processor further cause the wireless communications cell cite to:
route at least power from the primary power source, generated power, or stored power to a communications interface.

8. The wireless communications cell site of claim 6, wherein the instructions when executed by the processor further cause the wireless communications cell cite to:
employ a battery circuit to store generated power;
sense a voltage of the battery circuit;
determine a rate of change of the voltage; and
determine a failure condition of the battery circuit based, at least in part, on the rate of change of the voltage.

9. The wireless communications cell site of claim 6, wherein the instructions when executed by the processor further cause the wireless communications cell cite to:
employ a battery circuit to store generated power;
sense a voltage of the battery circuit;
if the sensed voltage represents that the battery circuit has less than approximately a 20 percent charge, enable the generator; and
if the sensed voltage of the battery circuit represents that the battery circuit has more than approximately an 82 percent charge, disable the generator.

10. The wireless communications cell site of claim 6, wherein the instructions when executed by the processor further cause the wireless communications cell cite to:
receive an operational status of a back-haul that is coupled to a communications interface; and
selectively employ the generator based, at least in part, on the received operational status of the back-haul.

11. A non-transitory computer-readable medium having stored thereon instructions that when executed by a processor cause a wireless communications cell site having a transceiver and associated telecommunications components to:
receive power from a primary power source to power the wireless communications cell site;
while receiving power from the primary power source, employ a first number of rectifiers to rectify the power received from the primary power source,
wherein each of the first number of rectifiers is coupled in parallel between the primary power source and at least one output terminal to supply power to the telecommunications components of the wireless communications cell site;

determine an availability status of the primary power source;

selectively enable and disable a generator to generate power based, at least in part, on the availability status; and while employing the generator to generate power, employ a second number of rectifiers to rectify the generated power,
wherein the second number is less than the first number, and
wherein each of the second number of rectifiers is coupled in parallel between the generator and the output terminal to supply power to the telecommunications components of the wireless communications cell site.

12. The non-transitory computer-readable medium of claim 11, wherein the instructions when executed additionally cause the wireless communications cell site to:
route at least power from the primary power source, generated power, or stored power to a communications interface.

13. The non-transitory computer-readable medium of claim 11, wherein the instructions when executed additionally cause the wireless communications cell site to:
employ a battery circuit to store generated power;
sense a voltage of the battery circuit;
determine a rate of change of the voltage; and
determine a failure condition of the battery circuit based, at least in part, on the rate of change of the voltage.

14. The non-transitory computer-readable medium of claim 11, wherein the instructions when executed additionally cause the wireless communications cell site to:
employ a battery circuit to store generated power;
sense a voltage of the battery circuit;
if the sensed voltage represents that the battery circuit has less than approximately a 20 percent charge, enabling the generator; and
if the sensed voltage of the battery circuit represents that the battery circuit has more than approximately an 82 percent charge, disabling the generator.

15. The non-transitory computer-readable medium of claim 11, wherein the instructions when executed additionally cause the wireless communications cell site to:
receive an operational status of a back-haul that is coupled to a communications interface; and
selectively employ the generator based, at least in part, on the received operational status of the back-haul.

* * * * *